United States Patent [19]

Dwyer

[11] Patent Number: 5,091,890

[45] Date of Patent: Feb. 25, 1992

[54] METHOD OF EXTRACTING TARGET RANGE AND DOPPLER INFORMATION FROM A DOPPLER-SPREAD SIGNAL

[75] Inventor: Roger F. Dwyer, Niantic, Conn.

[73] Assignee: The United States of America as represented by the Secretary of the Navy, Washington, D.C.

[21] Appl. No.: 702,550

[22] Filed: May 20, 1991

[51] Int. Cl.[5] .............................................. G01S 15/00
[52] U.S. Cl. ........................................ 367/99; 367/904
[58] Field of Search ................................... 367/99, 904

[56] References Cited

U.S. PATENT DOCUMENTS 4,980,868  12/1990  Teel .................................... 367/904

Primary Examiner—Daniel T. Pihulic
Attorney, Agent, or Firm—Michael J. McGowan; Prithvi C. Lall; Michael F. Oglo

[57] ABSTRACT

A method of extracting target range and Doppler information from a Doppler-spread signal is provided. An acoustic waveform is transmitted underwater and impinges upon a submerged Doppler-spread target. Doppler-spread sonar echoes resulting from the transmitted waveform are received and digitized. The received sonar echo is separated into its inphase and quadrature components thereby forming a complex vector function. A fourth-order cumulant spectrum is generated from the complex vector function based upon three time delays. In order to extract the range and Doppler information from the Doppler-spread signal, the first of the time delays is set equal to zero while the second and third time delays are set equal to one another.

6 Claims, 5 Drawing Sheets

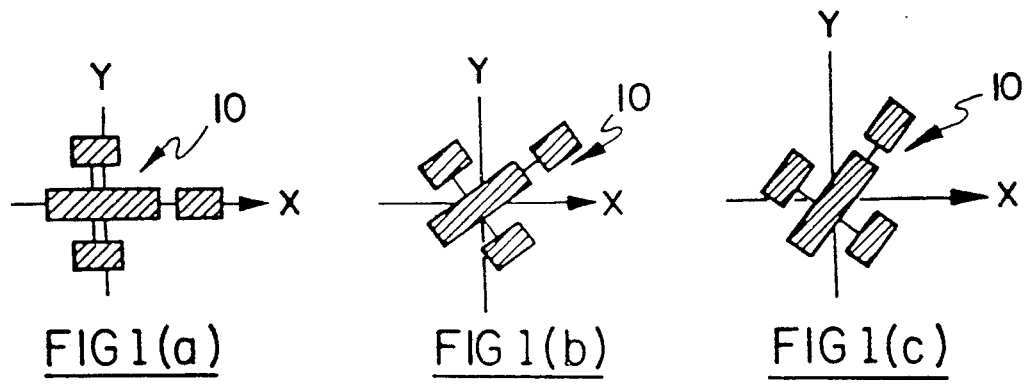
FIG 1(a)    FIG 1(b)    FIG 1(c)
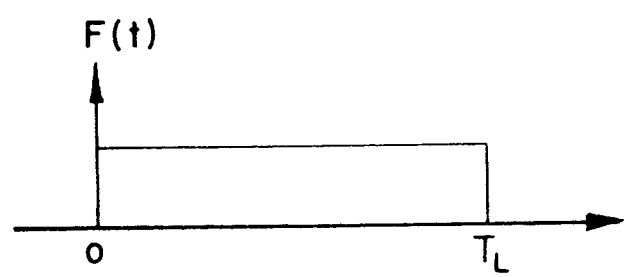
FIG. 2(a)
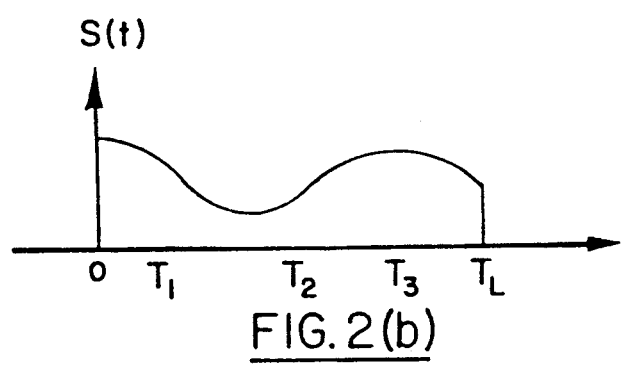
FIG. 2(b)
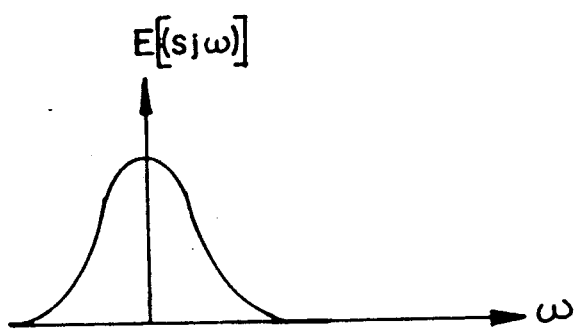
FIG. 2(c)
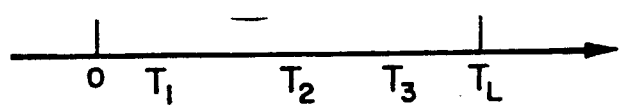

METHOD OF EXTRACTING TARGET RANGE AND DOPPLER INFORMATION FROM A DOPPLER-SPREAD SIGNAL

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

This invention relates generally to Doppler processing and more particularly to a method of extracting target range and Doppler information about velocity of the target from a Doppler-spread active sonar echo.

(2) Description of the Prior Art

Acoustic signal processing techniques using the Doppler shift to extract target range data are well known in the art. It is also well known that the time-varying attenuation of a target causes a Doppler-spread energy spectrum in the frequency domain. This phenomenon is taught by Harry L. Van Trees in "Detection, Estimation and Modulation Theory, Part III", John Wiley and Sons, Inc., 1971, a brief overview of which follows hereinbelow to facilitate understanding of the present invention.

An active sonar system, basically, transmits an acoustic signal into the ocean and from the returned echo attempts to extract information about the target. Its performance depends to a large extent on the motion of the target and ocean characteristics such as its non-linearity. Often, the ability of the sonar system to extract range and Doppler information is degraded by a phenomenon called Doppler spreading, which can be caused by the target and/or by the medium. This phenomenon also arises in radar, communications, and optical applications. A transmitted sonar signal can be Doppler-spread from:

a) The changing orientation of the target during the time that the transmitted signal interacts with it. Physically, this is characterized by the pulse length being longer than the reciprocal of the target reflection process.

b) The propeller on stern aspect targets. A similar effect is observed from radar returns of proller-driven aircraft.

c) The interference from scatterers fo the target. Typical sonar returns are shown in R. Urick, Principles of Underwater Sound, McGraw-Hill, Inc., 3rd Edition, 1983, on page 325.

d) The fluctuations caused by the medium. For the sonar application fluctuations would have to occur over the pulse duration. These are typically characterized as fast fading.

e) The physical effects causing platform motion and vibration.

A target geometry 10 representative of any reflective surface such as an airplane, a satellite or a submarine is shown in FIGS. 1(a), (b) and (c). The direction of signal propagation is along the x-axis. The target orientation in FIGS. 1(a), (b) and (c) changes as a function of time where FIG. 1(a) is at time $t_1$, FIG. 1(b) is at time $t_2$ and FIG. 1(c) is at time $t_3$. As the orientation of target geometry 10 changes, so do its reflective characteristics.

The target geometry 10 is illuminated with a long acoustic pulse f(t), t=0 to $T_L$ where $T_L > t_3$, as shown in FIG. 2(a). A typical return signal envelope s(t) as a function of time might look like that shown in FIG. 2(b). It is readily apparent that the effect of the changing orientation of target geometry 10 is a time-varying attenuation of the envelope. Since the time-varying attenuation is an amplitude modulation, the energy spectrum of the return signal $E[s(j\omega)]$ is spread in the frequency domain as shown in FIG. 2(c). The amount of spreading depends on the rate at which the target geometry's reflective characteristics are changing. This type of target is known as a Doppler-spread target.

Current acoustic processing techniques make use of a second order spectrum to extract range and Doppler information from a return signal envelope. However, the prior art method is not effective in extracting such information when the target is a Doppler-spread target undergoing orientation changes. The prior art method is also susceptible to additive Gaussian noise which degrades the signal-to-noise ratio.

SUMMARY OF THE INVENTION

Accordingly, it is an object of the present invention to provide a method of extracting target range and Doppler information from a Doppler-spread signal.

Another object of the present invention is to provide a method of extracting target range and Doppler information about velocity of the target from a Doppler-spread signal that eliminates additive Gaussian noise.

Other objects and advantages of the present invention will become more obvious hereinafter in the specification and drawings.

In accordance with the method of the present invention, a series of acoustic pulses are transmitted into a medium where a target resides. When the transmitted pulses impinge upon the target, a sonar echo is generated. The received sonar echo is matched with the transmitted pulses to generate a complex vector function. The complex vector function is filtered and then the fourth-order cumulant, which is in general a function of three time delays is estimated. By setting one time delay equal to zero and the remaining two time delays equal to one another, target range and Doppler information are extracted even if the sonar echo generated by the target is not Doppler-spread. Once the fourth-order cumulant is extracted, the fourth-order cumulant spectrum is obtained by taking its fast Fourier transform.

BRIEF DESCRIPTION OF THE DRAWINGS

FIGS. 1(a), (b) and (c) depict a target geometry undergoing a change in orientation over time;

FIG. 2(a) graphically depicts a long acoustic pulse as a function of time used to illuminate the target geometry in FIGS. 1(a), (b) and (c);

FIG. 2(b) graphically depicts the return signal envelope as a function of time from the target geometry due to the acoustic pulse in FIG. 2(a);

FIG. 2(c) graphically depicts the energy spectrum of the return signal of FIG. 2(b) Doppler-spread in the frequency domain;

DESCRIPTION OF THE PREFERRED EMBODIMENTS

Figure 3:
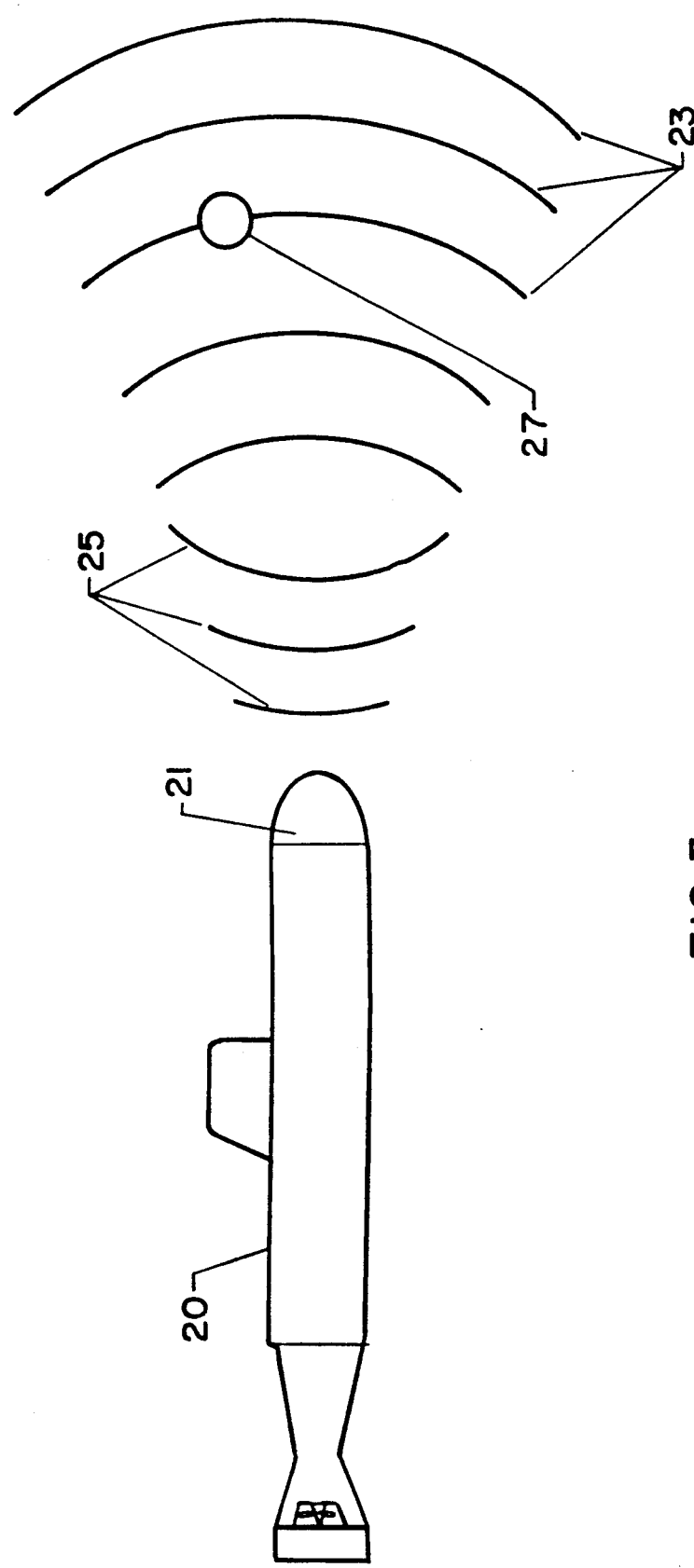
FIG. 3 is a diagrammatic view of a submarine transmitting acoustic pulses to and receiving sonar echoes from a submerged target according to the method of the present invention.

Referring now to FIG. 3, a submarine 20 is equipped with an active sonar system 21 for transmitting acoustic pulses 23 and for receiving sonar echoes 25 from acoustic pulses 23 impinging on a submerged target 27. Target 27 may be stationary, moving, and/or undergoing changes in orientation such that sonar echoes 25 are Doppler spread. Accordingly, target 27 will hereinafter be referred to as a Doppler-spread target. However, the method of the present invention will also extract range and Doppler information from a sonar echo that experiences no Doppler spreading. It is to be further understood that while the method of the present invention will be described with reference to the underwater sonar scenario of FIG. 3, it is not so limited. The method of the present invention will also apply to an active acoustic system operating in any medium such as air or to an electromagnetic signal as in radar.

The method of the present invention represents a new way of extracting range and Doppler information about the target velocity from sonar echoes 25, which in the time domain would resemble the amplitude modulated return signal envelope (i.e., spectral density) shown in FIG. 2(b). Amplitude modulation will result even if target 27 is stationary since the environment surrounding target 27 is in motion.

Figure 4:
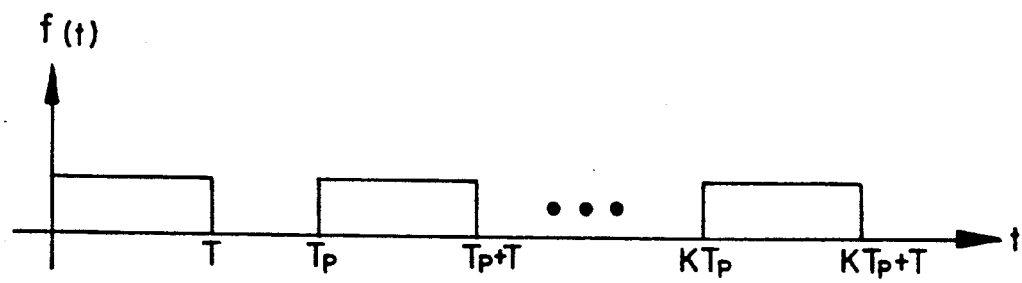
FIG. 4 graphically depicts the transmitted waveform in the time domain according to the method of the present invention.

For purposes of description, transmitted acoustic pulses 23 are frequency shifted keyed (FSK) waveforms. However, the method applies to any type of waveforms including linear frequency modulation (LFM) and continuous wave (CW). In all cases, however, the transmitted waveform is y(i), i=0 to $T_\omega$ where $T_\omega$ is the time in seconds before the waveform is repeated. The time duration or length of each subpulse is T seconds where $T_p$ is the repetition interval of the subpulse. The subpulse duration and repetition cycles are shown graphically in FIG. 4. The transmitted waveform y(i) may be written mathematically as $$y(i) = \sum_{n=0}^{k} h(i - nT_p)\cos[(\omega_n i + \theta_n)] \quad (1)$$

where $\omega_n$ is the transmitted radian frequency, and $\theta_n$ is the phase of the n-th transmitted subpulse. Each subpulse $h(i-nT_p)$ may be defined as follows:

$$h(i-nT_p) = b_n[u(i-nT_p) - u(i-nT_p+T)], \quad (2)$$

where u() is the unit step function, and $b_n$ n=o, ... k are amplitudes of the subpulse as depicted in FIG. 4. The total pulse length is, $T_L = KT_p + T$ Accordingly, the Doppler-spread received signal or echo 25 is given by:

$$z(i) = a\left(i - \frac{T_R}{2}\right) \sum_{n=0}^{k} h(i - nT_p - \quad (3)$$

$$T_R)\cos(\omega_n + \omega_{nd})(i - T_R) + \theta_n + \phi],$$

where $T_R$ is the range to the target 27, $\omega_{nd}$ is the Doppler shift radian frequency associated with each transmitted radian frequency $\omega_n$, $\phi$ is a random phase angle between 0 and $2\pi$, and a(i) represents a model for Doppler spreading as taught by Van Trees.

The inphase and quadrature components of z(i), namely, $Z_c(i)$ and $Z_s(i)$, respectively may be written as follows:

$$Z_c(i) = Z(i)y_c(i) \quad (4)$$

$$Z_s(i) = Z(i)y_s(i) \quad (5)$$

where, $$y_c(i) = \sum_{n=0}^{k} h(i - nT_p - T_R)\cos[\omega_n(i - T_R) + \theta_n] \quad (6)$$

and, $$y_s(i) = \sum_{n=0}^{k} h(i - nT_p - T_R)\sin[\omega_n(i - T_R) + \theta_n] \quad (7)$$

$T'_R$ is a parameter that is adjusted in order to search for the true range of the target 27.

Figure 5:
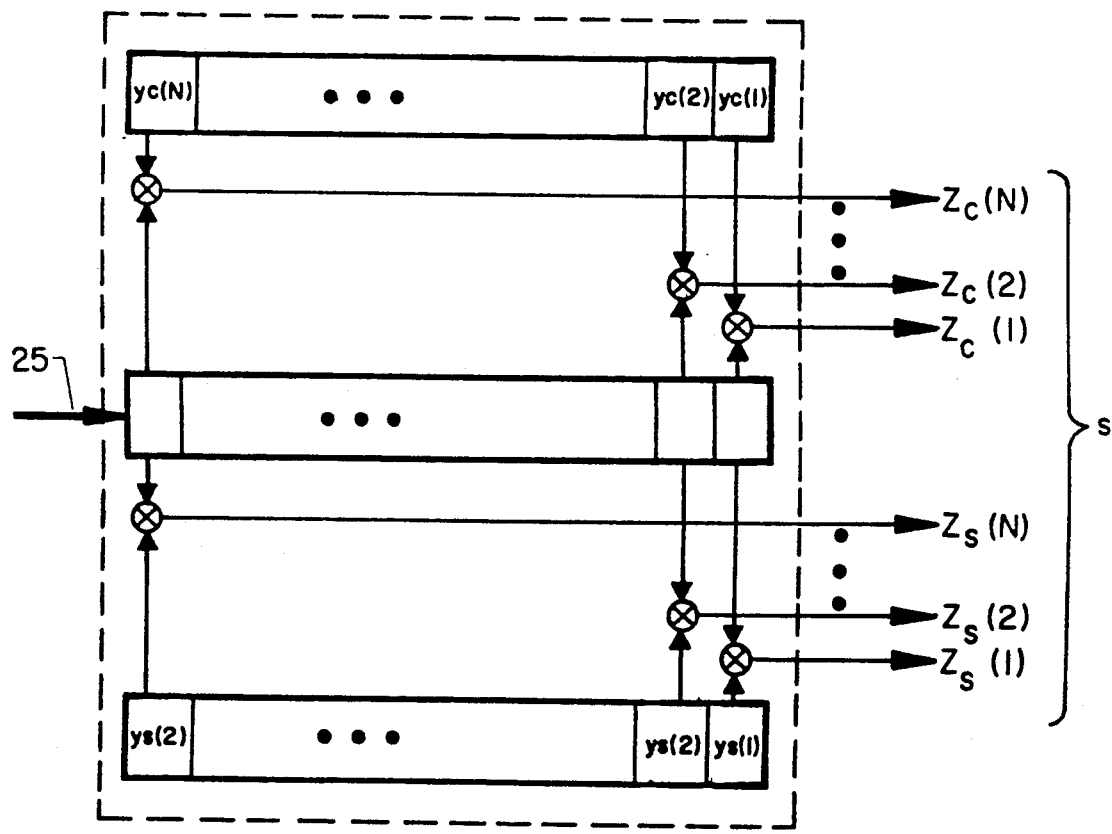
FIG. 5 is a schematic representation of a discrete matched filter used in the method of the present invention.
Figure 6:
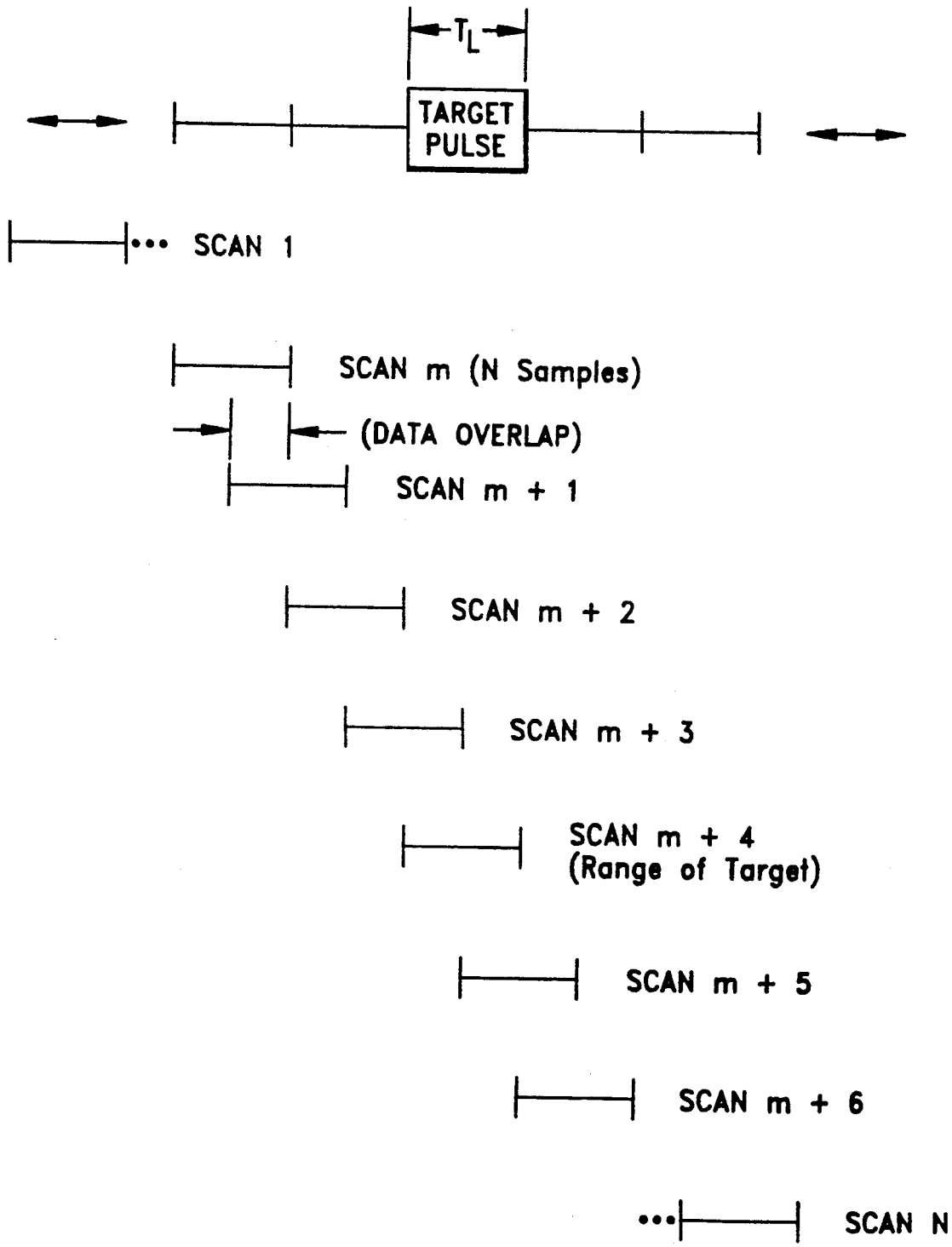
FIG. 6 is a diagram showing the received pulse and depicts how the input scans are obtained.

For the implementation of the invention, the inphase and quadrature components $Z_c$ and $Z_s$ are obtained as shown in FIG. 5, with $T'_R=0$. Based on equation 6, with, $T'_R=O$, N samples of the inphase component, $Y_c(1), Y_c(2), \ldots, T_c(N)$, and, based on equation 7, N samples of the quadrature component, $Y_s(1), Y_s(2), \ldots, Y_s(N)$, are stored in shift registers, as shown in FIG. 5, to construct the matched filter. The inphase and quadrature samples are permanently stored in the shift registers. As depicted in FIG. 6, the received data are segmented into scans of N samples each. Then for each scan the N samples are loaded into the data shift register as shown in FIG. 5. This only requires shifting the newest samples into the register and removing the oldest. The actual number of new samples is variable and can be adjusted. As soon as the newest samples are shifted in and the oldest samples are shifted out of the data shift register the product of each samples in the data shift register with each corresponding sample of the inphase shift register and each corresponding sample of the quadrature shift register are obtained to form the current scan matched filter output consisting of N samples of, $Z_c(1), Z_c(2), \ldots, Z_c(N)$, and N samples of, $Z_s(1), Z_s(2), \ldots, Z_s(N)$. Subsequant matched filter scans are produced in the same way.

Figure 7:
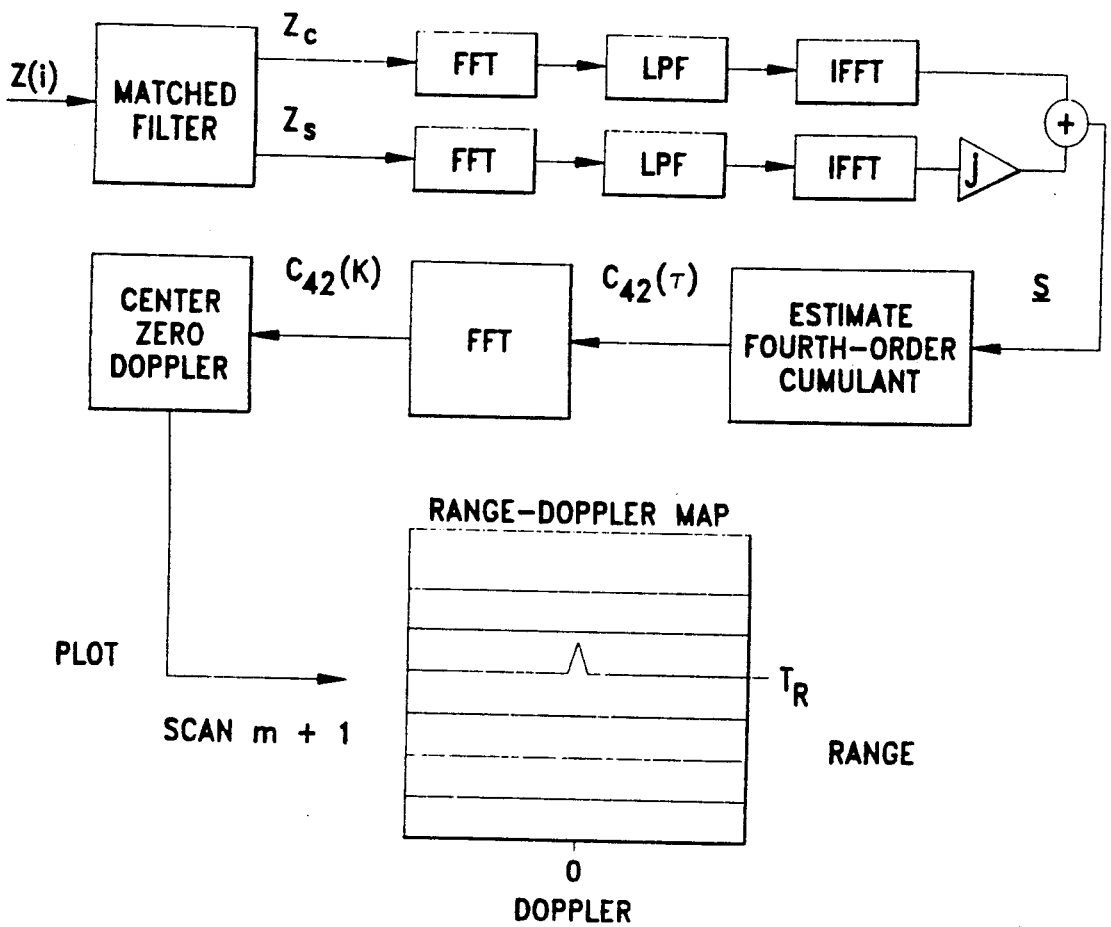
FIG. 7 is a block diagram showing the overall active sonar system from input scans to the Range-Doppler map output.
Figure 8:
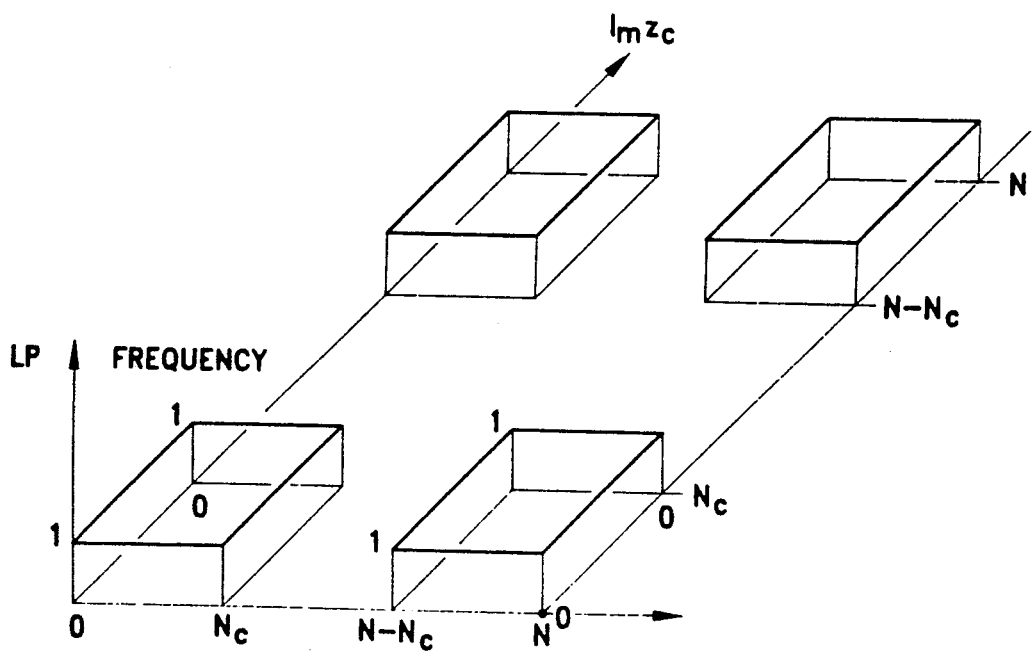
FIG. 8 is a schmatic of the lowpass filter (LPF) implementation shown in FIG. 7.

FIG. 7 shows the overall processing block diagram. At the output of the matched filter the vectors $Z_c$ and $Z_s$ are each transformed into the frequency domain by a fast Fourier transform (FFT). In the frequency domain a lowpass filtering operation is employed as shown in FIG. 8 for the $Z_c$ vector only. The other vector, $Z_s$, id lowpass filtered in the same way and therefore not shown in FIG. 8. Since the output of the FFT is complex a two-dimensional lowpass filter is shown in FIG.

8. As shown in FIG. 8, $N_c$, $N_c > N$, represents a parameter that's used to control the lowpass filtering operation. All frequencies above $N_c$ and below $N - N_c$ are set to zero. The other frequencies are not changed. Once the lowpass filtering operation is completed the filtered data are transformed back into the time domain by the inverse fast Fourier transform (IFFT). Since the samples in the time domain are now real, the lowpass filtered vector $Z_s$, is multiplied by the complex number, j, and summed with the lowpass filtered vector $Z_c$, to form the vector, $S = Z_c + jZ_s$, as shown in FIG. 7.

A fourth-order cumulant of the complex function s(i), i = 1, 2, ..., N is generated and may be expressed as:

$$C_4(j_1, j_2, j_3) = \frac{1}{N} \sum_{i=1}^{N} s(i)s(i + j_1)s^*(i + j_2)s^*(i + j_3) - \tag{8}$$

$$\frac{1}{N} \sum_{i=1}^{N} s(i)s(i + j_1) \frac{1}{N} \sum_{i=1}^{N} s^*(i + j_2)s^*(i + j_3) -$$

$$\frac{1}{N} \sum_{i=1}^{N} s(i)s^*(i + j_2) \frac{1}{N} \sum_{i=1}^{N} s(i + j_1)s^*(i + j_3) -$$

$$\frac{1}{N} \sum_{i=1}^{N} s(i)s^*(i + j_3) \frac{1}{N} \sum_{i=1}^{N} s(i + j_1)s^*(i + j_2),$$

where $s^*$ represents the complex conjugate, and $j_1$, $j_2$ and $j_3$ are time delays. In order to extract the range and Doppler information from the Doppler-spread signal, the method of the present invention solves equation (8) by setting $j_1 = 0$ and $j_2 = j_3 = \tau$. A time delay is used to compare a signal with itself or with another signal shifted in time by the time delay. This process is called correlation or a second-order moment. If more than one time delay is used as in equation (8), the process represents a higher-order moment. Since the Gaussian expansion is subtracted from the moment, equation (8) is called a cumulant. In equation (8), a signal is compared with itself at three time delays. The comparison is the product of the signals, each delayed by a different time delay and averaged over time. To obtain the fourth-order cumulant spectrum, the 3-dimensional Fourier transform of equation (8) is taken over the three time delays. The fourth-order cumulant spectrum contains the frequency information of the moment or cumulant. The method of the present invention simplifies this process by reducing the fourth-order cumulant to one time delay and therefore only a 1-dimensional Fourier transform is required. Thus, the fourth-order cumulant spectrum of the invention represents the Doppler information of the target 27 with additive Gaussian noise removed. Range information of the target is obtained by repeating the above process for each segment of data as depicted in FIG. 7. A target is represented when a peak is observed at a particular range and Doppler as shown in FIG. 7.

The fourth-order cumulant of the invention is therefore, $$C_4(\tau) = \frac{1}{N - \tau} \sum_{i=1}^{N-\tau} s(i)^2 s^*(i + \tau)^2 - \tag{9}$$

$$\left[ \frac{1}{N - \tau} \sum_{i=1}^{N-\tau} s(i)s^*(i + \tau) \right]^2$$

for $\tau = 0, 1, 2, \ldots, N/2$. Note that the second term of equation 8 is not included in equation 9 (since it is zero).

For each segment of data consisting of N samples, the fourth-order cumulant is obtained. The fast Fourier Transform (FFT) of the fourth-order cumulant is taken over the time delay parameter $\tau$, $$\left( z = 0, 1, \ldots, \frac{N}{2} \right) \tag{10}$$

for each segment. When this is accomplished, the Doppler as function of range is obtained as depicted in FIG. 7.

But before the fourth-order cumulant spectrum is displayed in the range-Doppler map the data are rearranged so that zero-Doppler corresponds to zero frequency in the range-Doppler map as shown in FIG. 7.

The advantages of the present invention are numerous. A simple method of extracting target range and Doppler information that is unaffected by Doppler-spreading is provided. The method may be used effectively regardless of the type of acoustic waveform or the medium in which the waveform propagates. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of extracting target range and Doppler information from an active sonar echo created by the target, said method being unaffected by Doppler-spreading and comprising the steps of:
    transmitting a series of acoustic pulses into a medium;
    receiving sonar echoes from the target associated with said transmitted series of pulses;
    matching said transmitted series of pulses to said received sonar echoes to extract a transmitted frequency from said received sonar echoes to generate a complex vector function; and
    filtering said complex vector function to generate a fourth-order cumulant spectrum wherein said spectrum is indicative of the target range and Doppler information, independent of Doppler-spreading.

2. A method as in claim 1 wherein said fourth-order cumulant spectrum is a function of three time delays wherein a first time delay is zero and second and third time delays are equal.

3. A method as in claim 1 wherein the medium is water.

4. A method as in claim 1 wherein the target exhibits motion.

5. A method as in claim 1 wherein the target is stationary.

6. A method of extracting underwater target range and Doppler information from an active sonar echo, comprising the steps of:
    receiving the sonar echo as a function of time;
    segmenting the received sonar echo into sonar echo segments indicative of a particular range;
    digitizing each sonar echo segment;
    separating each sonar echo segment into its inphase and quadrature components wherein said inphase and quadrature components comprise a complex vector function representative of the sonar echoes;
    generating a fourth-order cumulant from said complex vector function wherein said fourth-order cumulant is a function of three time delays, a first time delay of zero, and second and third time delays equal to one another; and
    performing the fast Fourier Transform on said fourth-order cumulant to obtain a fourth-order cumulant spectrum.

* * * * *